US008452968B2

(12) United States Patent
Flores

(10) Patent No.: US 8,452,968 B2
(45) Date of Patent: May 28, 2013

(54) SYSTEMS, METHODS, APPARATUS, AND COMPUTER READABLE MEDIA FOR INTERCEPTING AND MODIFYING HMAC SIGNED MESSAGES

(75) Inventor: Jose Luis Flores, Austin, TX (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1048 days.

(21) Appl. No.: 12/211,077

(22) Filed: Sep. 15, 2008

(65) Prior Publication Data
US 2010/0070770 A1 Mar. 18, 2010

(51) Int. Cl.
*H04L 29/06* (2006.01)
(52) U.S. Cl.
USPC .......................... 713/176; 713/180; 713/181
(58) Field of Classification Search
USPC ........................................ 713/176, 180, 181
See application file for complete search history.

(56) References Cited

U.S. PATENT DOCUMENTS

| 6,874,149 | B1 * | 3/2005 | Bermudez et al. | 719/328 |
| 2008/0320302 | A1 * | 12/2008 | Pilant et al. | 713/161 |
| 2009/0220080 | A1 * | 9/2009 | Herne et al. | 380/255 |

* cited by examiner

*Primary Examiner* — Benjamin Lanier
(74) *Attorney, Agent, or Firm* — Tarek N. Fahmi, APC

(57) ABSTRACT

Systems, methods, apparatus and computer-executable instructions stored on computer-readable media for communicating a modified hash message authentication code (HMAC) signed message between two endpoints are provided. The HMAC signature of the message may include a plurality of components. In some cases, the HMAC signature is a Server Message Block (SMB) signature. The first and/or second endpoint may be a client, server, or host. Some embodiments of the present application utilize a proxy, such as a CIFS proxy. In one embodiment, HMAC signature information sent from the first endpoint to the second endpoint may be intercepted. A value for a component of the HMAC signature may be determined by, for example, using the intercepted HMAC signature information. The intercepted message may be modified, resigned using the intercepted HMAC signature information, and transmitted to a receiving endpoint.

13 Claims, 6 Drawing Sheets

SYSTEMS, METHODS, APPARATUS, AND COMPUTER READABLE MEDIA FOR INTERCEPTING AND MODIFYING HMAC SIGNED MESSAGES

FIELD OF APPLICATION

The present application relates to systems, methods, apparatus, and computer readable media storing computer-executable instructions for communicating a modified hash message authentication code (HMAC) signed message between two endpoints.

BACKGROUND

Asymmetric, or public key, cryptography may be used to facilitate secure communications between two or more endpoints, typically within a computer network. Asymmetric cryptography requires the use of both a public and a secret key for a message transmitted and/or received by an endpoint. The public key of an endpoint may be widely distributed, while the secret key is kept secret. A recipient's public key is used to encrypt an incoming message and the message may only be decrypted by the corresponding secret key of the recipient when received. In this way, a message encrypted with a recipient's public key may only be decrypted by the recipient's corresponding secret key.

A Hash Message Authentication Code (HMAC) is a type of asymmetric cryptographic message authentication code that uses a secret key and a cryptographic hash function to generate an authentication code for an endpoint. HMACs may be used to verify data integrity as well as the authenticity of a message.

HMACs are commonly used within the Server Message Block (SMB) protocol. The SMB protocol is used to provide a secure and authenticated mechanism for exchanging information within a computer network. SMB is commonly used on computers and networks using Microsoft™ products. SMB may be used to provide access to, for example, files, hardware devices (e.g., printers), serial ports, and other communication facilities within a computer network.

A new version of the SMB protocol, SMB2, was introduced by Microsoft™ in 2006. Advantages of SMB2 over SMB1 (the original version of SMB) include an improved ability to combine multiple actions into a single action through using a new compounding mechanism and considerably less complex code and are not directed toward improving SMB1's asymmetric cryptography.

Some Microsoft™ enabled computers and/or networks use the Common Internet File System (CIFS) as a computer and/or network platform. CIFS is based on SMB and allows file sharing across an intranet and/or the Internet. The HMAC signature for a CIFS enabled system is typically an SMB signature.

Messages signed with an HMAC signature must typically be sent from endpoint to endpoint in an unmodified fashion because changing even a single bit of the message alters the result of the hashing algorithm that generates the HMAC or SMB signature. If the signature of a message is altered, then the receiving endpoint will not be able to verify the signature of the message and the communication of the message will fail.

While the inability to alter HMAC-signed messages is generally considered to be an important feature of HMAC-based communications, it is sometimes desirable to modify such messages. Such circumstances include, for example, acceleration of the message through a proxy pair or other network communication facility. Currently though, when such modifications are applied to an HMAC-signed message, the modification process alters the original HMAC signature such that the signature cannot be verified by the receiving endpoint.

Thus, systems, methods and apparatus enabled to communicate a modified HMAC-signed message to an endpoint are desired.

SUMMARY

Systems, methods, apparatus and computer readable media storing computer-executable instructions for communicating a modified hash message authentication code (HMAC) signed message between two endpoints are provided. The HMAC information associated with the message may include a plurality of components. In some cases, the HMAC signature is a Server Message Block (SMB) signature. The first and/or second endpoint may be, for example, a client, server, or host. Some embodiments of the present application utilize a proxy, such as a CIFS proxy. In one embodiment, HMAC signature information sent from a first endpoint to a second endpoint may be intercepted. A value for a component of the HMAC signature may be determined by, for example, using or analyzing the intercepted HMAC signature information.

A HMAC signed message sent from the first endpoint to the second endpoint may also be intercepted. The message may be modified and resigned using, for example, the determined values. The resigned message may then be sent to the second endpoint.

In one embodiment, components of the HMAC signature may include, for example, a sequence number, a connection signing use NTLM challenge response, a secret key, a public key, a connection signing NTLM challenge response, and/or a message. The connection signing use NTLM challenge response, the connection signing NTLM challenge response, and/or the message may be derived using, for example, intercepted HMAC signature information.

In some cases, an initial sequence number for the beginning of an HMAC transmission session may be determined and the sequence number of the intercepted message may be derived using the initial sequence number.

In another embodiment, the message may be transmitted along a transmission pathway and the transmission pathway may include interface entry points. HMAC signature information may then be intercepted at the interface entry points and a secret key for the intercepted message may be derived using the intercepted secret key.

In some embodiments, a list of unmatched secret keys may be acquired at, for example, an interface (e.g., an SSPI or GSS-API) entry point. A secret key on the list of unmatched secret keys may be matched with the modified message and a component of the HMAC signature may be determined. An HMAC signature for the modified message may be generated using, for example, the associated secret key and the determined component. It may then be determined whether the generated HMAC signature matches the HMAC signature of the intercepted message. When the signature matches, the modified message may be resigned with the generated HMAC signature, and transmitted to the second endpoint.

In another embodiment, an application may generate the HMAC signature for the intercepted message. The application may be queried for information related to the intercepted message. Data may then be received that includes a secret key for the intercepted message and the data may be analyzed to determine the secret key.

In another embodiment, HMAC signature information sent from the first endpoint to the second endpoint may be intercepted. The HMAC signature information may include, for example, a sequence number and a secret key. An HMAC signed message sent from the first endpoint to the second endpoint may be intercepted. A boundary of the message may be recognized and a sequence number of the message may be determined. A secret key for the message may be determined. The message may be modified. The modified message may then be resigned using, for example, the message boundary, sequence number and/or secret key. The resigned message may then be transmitted to the second endpoint.

BRIEF DESCRIPTION OF THE DRAWINGS

The present application is illustrated by way of example, and not limitation, in the figures of the accompanying drawings, in which.

DETAILED DESCRIPTION

Figure 1:
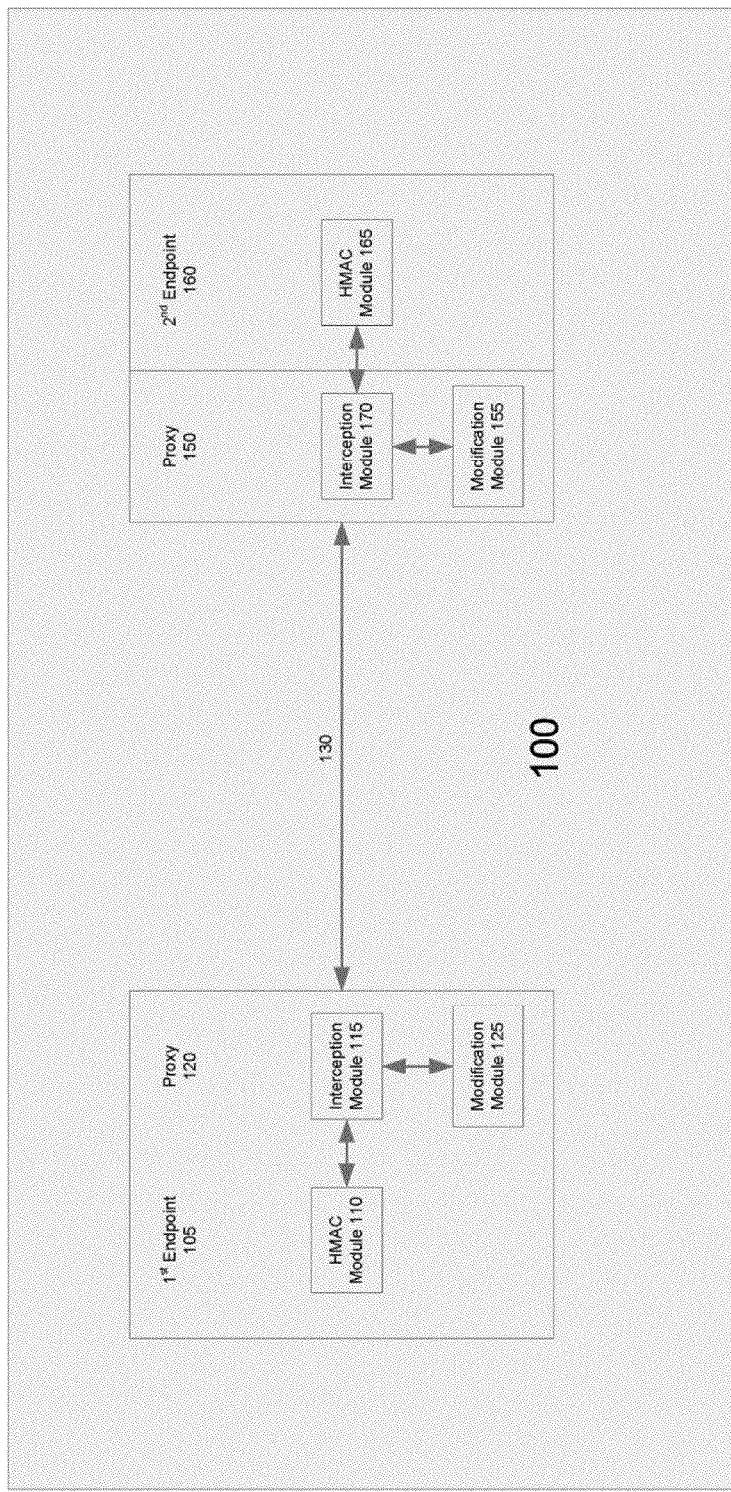
FIG. 1 illustrates an exemplary system for communicating a modified HMAC signed message from a first endpoint to a second endpoint, consistent with an embodiment of the present invention.

Systems, methods, apparatus, and computer readable media storing computer-executable instructions for transmitting a modified Hash Message Authentication Code (HMAC) signed message between two endpoints are provided. HMAC signatures may be used to verify the credentials of, for example, transmitted and/or received messages or endpoints within a computer network, such as a local area network (LAN), a wide area network (WAN), and/or a network of networks (such as the Internet). Some embodiments may be enabled to utilize Microsoft's™ Common Internet File System (CIFS). CIFS-enabled systems are capable of sharing files across an intranet and/or the Internet. The HMAC signature for a CIFS enabled system, may be, for example, a Server Message Block (SMB) signature. Some embodiments may include an interface entry point, such as a Security Support Provider Interface (SSPI) entry point or a Generic Security Service Application Programming Interface (GSS-API) entry point. The systems, methods, apparatus and computer readable media disclosed herein are compatible with both SMB1 and SMB2 and other protocols that use HMAC or similar signatures.

Before discussing various embodiments of the invention, some introduction is helpful. The SMB protocol (and, in particular the SMB1 version of that protocol) generates a signature for a given SMB message by:
a. Setting an 8-byte SecuritySignature field in the SMB header of a message to 0;
b. Copying a 32-bit sequence number into the first 4 bytes of the SecuritySignature in the SMB header; and
c. Applying the following algorithm:

```
IF ConnectionSigningUseNTLMChallengeResponse THEN
    MD5Init( md5context )
    MD5Update( md5context, ConnectionSigningSessionKey )
    MD5Update( md5context,
    ConnectionSigningNTLMChallengeResponse )
    MD5Update( md5context, SMB message )
    MD5Final( digest, md5context )
ELSE
    MD5Init( md5context )
    MD5Update( md5context, ConnectionSigningSessionKey )
    MD5Update( md5context, SMB message )
    MD5Final( digest, md5context )
END IF
SET signature TO first 8 bytes of digest
```

Given this information we see that there are potentially 5 inputs to the signing algorithm.
a. Sequence Number: a 32-bit sequence number for the subject message.
b. ConnectionSigningUseNTLMChallengeResponse: the result of setting a CAP_EXTENDED_SECURITY flag during session setup.
c. ConnectionSigningSessionKey: the session key generated during authentication of the SMB session.
d. ConnectionSigningNTLMChallengeResponse: the challenge response sent during SMB session setup.
e. SMB message—the actual SMB message to be sent, starting with the SMB header.

Of these 5 inputs into the signature generation algorithm, three can be directly derived by snooping the communication between the endpoints involved therein. These include the ConnectionSigningUseNTLMChallengeResponse, the SMB message, and the challenge response. The sequence number is generated deterministically, and can therefore be derived by careful bookkeeping. The Signing Session Key, however, is a secret known only to each of the endpoints. The present invention provides a method to obtain that session key.

For SMB2, signature generation is similar, with implementation differences in the HMAC algorithm (SHA1 vs. MD5), the length of the signature, and other details. Nevertheless, the same approach used for interception of SMB1 messages is applicable for SMB 2.0. Indeed, the present invention provides a general technique of intercepting session/secret keys for any protocol that uses such items for encryption, integrity checking or authentication in order to provide successful man-in-the-middle intervention and thus impersonate a client to a server or vice-versa. The interception of the necessary secrets is entailed using Application Programming Interface (API) hooks, for example the SSPI or GSS-API hooks mentioned below.

As more fully described below, the present solution relies on a CIFS (or other) proxy to recognize SMB message boundaries for both incoming and outgoing messages, track sequence numbers for an SMB connection, and determine the session signing key for a connection. SMB sequence number generation is fairly straightforward. In short, the sequence number always starts at a known value at the beginning of connection establishments, and increments by a well defined amount, depending on what type of SMB message that is being sent. The Microsoft SMB protocol specification describes in detail how the signature is generated and so those details will not be repeated here.

Current implementations of the Microsoft Windows™ XP and Vista™ SMB clients rely on the SSPI interface to perform authentication during session setup, and to negotiate which security package should be used. Therefore, in various embodiments of the invention, the present methods provide for intercepting key SSPI entry points used by the Windows SMB client, to obtain the session key. In brief, the SSPI interface is exposed via a kernel mode DLL and is consumed by another routine. A redirector determines what the session key is by querying an authentication package following completion of the authentication process. By way of example, one API which may be used for such a query is ksecdd!QueryContextAttributes( ) with the SECPKG_ATTR_SESSION_KEY flag set. The return value for this API is a dataset that contains the session key. Thus, determining a session key is a relatively straightforward process of hooking the QueryContextAttributes entry point and intercepting the return value given when the SECKPG_ATTR_SESSION_KEY flag is set.

Matching the session key returned by the SSPI interface to a given connection requires a few additional details. Consider that there may be multiple connections being processed and therefore each connection has to be matched with its session key. For each intercepted session key, a series of operations are needed to match that key with a given SMB connection:
 a. The session key is returned via the QueryContextAttributes hook.
 b. The session key is passed from the kernel mode interceptor to a user mode service via any IPC mechanism.
 c. The user mode service keeps a list of "unmatched" session keys in local memory.
 d. On a new connection intercepted by the proxy (which has negotiated SMB signing), the list of unmatched session keys is checked until the session key used generates a signature that matches the signature received in the first SMB message requiring a signature.
 e. If a match is found, the matching session key is removed from the unmatched key list. If no match is found, then the connection can be passed through unmodified.

Purging session keys which are never matched can be done either by aging, or by extracting information from the signing procedure regarding the lifetime of the session key. An expiration time of a few minutes should be sufficient for most applications. Of course, in other embodiments, GSS-API hooks may be used.

As should be apparent from the description above, various embodiments of the present invention may be implemented with the aid of computer-implemented processes or methods (a.k.a. programs or routines) that may be rendered in any computer language. Moreover, some portions of this detailed description that follow are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Where embodied as computer-executable instructions, such instructions may be executed on any computer system. In such instances, the application may reside as a computer program stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. The algorithms and processes presented herein are not inherently related to any particular computer or other apparatus.

FIG. 1 illustrates an exemplary system 100 for communicating a modified HMAC signed message from a first endpoint to a second endpoint. System 100 may include, for example, a first endpoint 105 having an HMAC module 110, a first proxy 120 having an interception module 115 and a modification module 125, transmission pathway 130, a second proxy 150 having and an interception module 170 and a modification module 155, and a second endpoint 160 having an HMAC module 165. From this figure, it should be apparent that system 100 utilizes a split proxy arrangement and may also use an asymmetric or public key encryption system to verify the credentials of first and/or second endpoints 105 and 160 and/or any message they transmit and/or receive. For example, HMAC signatures may be used to verify messages passed between first end point 105 and second end point 160. In some embodiments, system 100 is compatible with Microsoft's CIFS protocol. In such cases, the HMAC signature for a CIFS-enabled system, such as system 100, may be, for example, a SMB signature and proxies 120 and 150 may be, for example, CIFS proxies.

First and second endpoints 105 and 160 may be any appropriate endpoints for communication within a computer network or network of networks. One or the other of first and/or second endpoints 105 and 160 may be, for example, a client, host, or server. HMAC modules 110 and 165 may be any form of security module capable of generating and/or verifying an HMAC signature, such as an SMB signature, for a message.

Proxies 120 and 150 may be any proxies compatible with the endpoints 105 and 160, for example, CIFS proxies. Interception modules 115 and 170 are configured to intercept communications transmitted to, or from, first and second endpoints 105 and 160, respectively. Exemplary intercepted communications include messages and security information such as secret and/or public security keys for an endpoint. Modification modules 125 and 155 are configured to modify messages transmitted from, or to, the endpoints 105 and 160, respectively. Exemplary modifications include compression and/or other actions to facilitate acceleration of messages across transmission pathway 130. Transmission pathway 130 may be any appropriate pathway for the communication of messages between the endpoints 105 and 160, including wired and wireless communication links.

Figure 2:
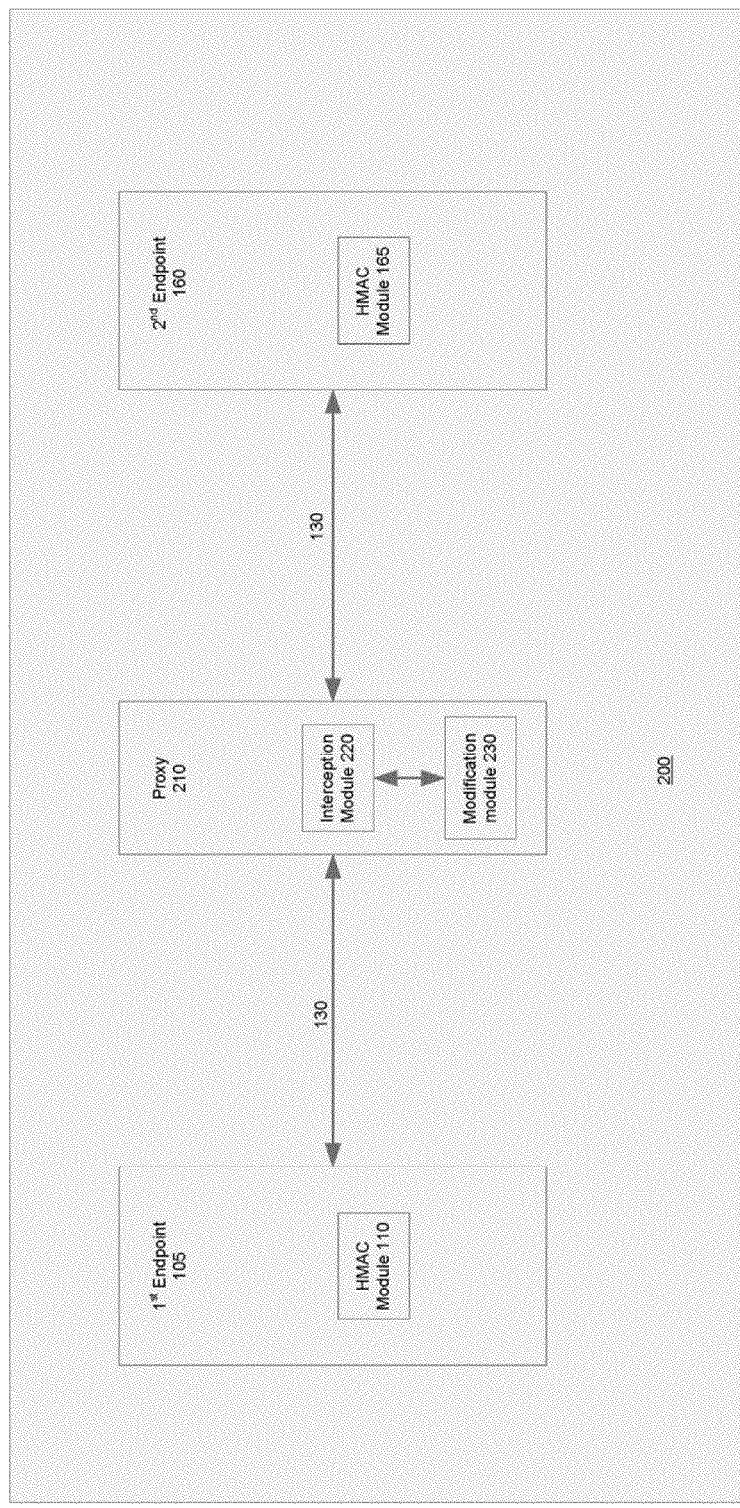
FIG. 2 illustrates a further example of a system for communicating a modified HMAC signed message from a first endpoint to a second endpoint, consistent with another embodiment of the present invention.

FIG. 2 illustrates a further exemplary system 200 for communicating a modified HMAC signed message from a first endpoint 105 to a second endpoint 160 via a single proxy 210. System 200 may use an asymmetric or public key encryption system to authenticate messages passed between the endpoints. In some embodiments, system 200 is compatible with Microsoft's CIFS protocol and in such cases the HMAC signature may be, for example, an SMB signature and proxy 210 may be, for example, a CIFS proxy. As above, the endpoints include respective HMAC modules 110 and 165, and the proxy 210 includes an interception module 220 and a modification module 230. These modules are configured in the fashion discussed above for similar modules of system 100.

Figure 3:
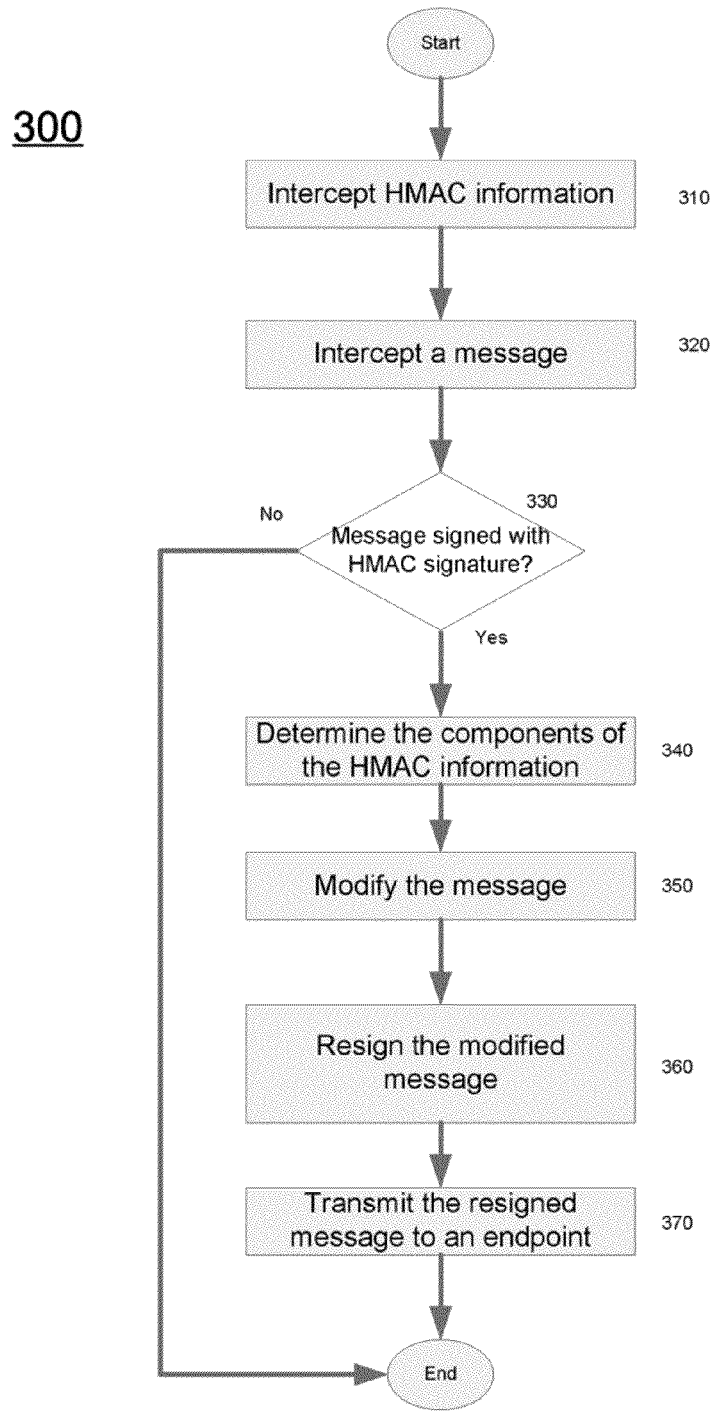
FIG. 3 illustrates an exemplary process for communicating a modified HMAC signed message from a first endpoint to a second endpoint, consistent with an embodiment of the present invention.

FIG. 3 illustrates an exemplary process 300 for communicating a modified HMAC-signed message from a first endpoint to a second endpoint. Process 300 may be performed by a system or apparatus enabled to communicate modified HMAC-signed messages from a first endpoint to a second endpoint. Exemplary systems for performing process 300 include system 100 and 200. For purposes of explanation, the following discussion will involve a transmission from a first endpoint, such as first endpoint 105, to a second endpoint, such as second endpoint 160. Of course, process 300 may also be performed for a transmission from a second endpoint to a first endpoint.

In step 310, HMAC information associated with a message and/or an endpoint is intercepted prior to transmission of the message from a first endpoint to a second endpoint (i.e., the interception occurs within the secure environment of the endpoint so that the sensitive HMAC information is not exposed in the clear). The HMAC information associated with a message may include, for example, HMAC information associated with the transmitting endpoint and an HMAC signature for the message. The HMAC information may be intercepted by, for example, interception module 115, 170, or 220. The HMAC information may be intercepted at, for example, an API entry point. The intercepted HMAC information may include, for example, a public and/or secret key for the first endpoint or second endpoint, a sequence number for an HMAC transmission, and/or a message. In embodiments including Microsoft enabled systems or applications, the intercepted HMAC information may include a connection signing use NT Lan Manager (NTLM) challenge response and/or connection signing NTLM challenge response. In step 320, a message may be intercepted while being transmitted from a first endpoint to a second endpoint. The message may be intercepted by, for example, interception module 115, 170, or 220.

In step 330, the intercepted message is checked to determine whether or not it is signed with an HMAC signature. If the message is not signed with an HMAC signature, then process 300 quits. In some embodiments, when the message is not signed with an HMAC signature, the intercepted message may be directly transmitted to the second endpoint.

In step 340, one or more components of the HMAC information associated with, for example, the intercepted message, may be determined. Further details regarding this determination are provided with reference to FIGS. 4-6.

In step 350, the intercepted message may be modified by, for example, modification module 125, 155, or 230. Exemplary modifications include compression and/or acceleration of the message. In step 360, the modified message may be resigned using, for example, the one or more components of the HMAC information determined in step 340. In most cases, the HMAC signature used to resign the modified message matches the HMAC signature of the intercepted message such that the modified message may be decrypted by a receiving, or second, endpoint. Following resignature, the message may be transmitted to the second endpoint (step 370) and process 300 quits.

Figure 4:
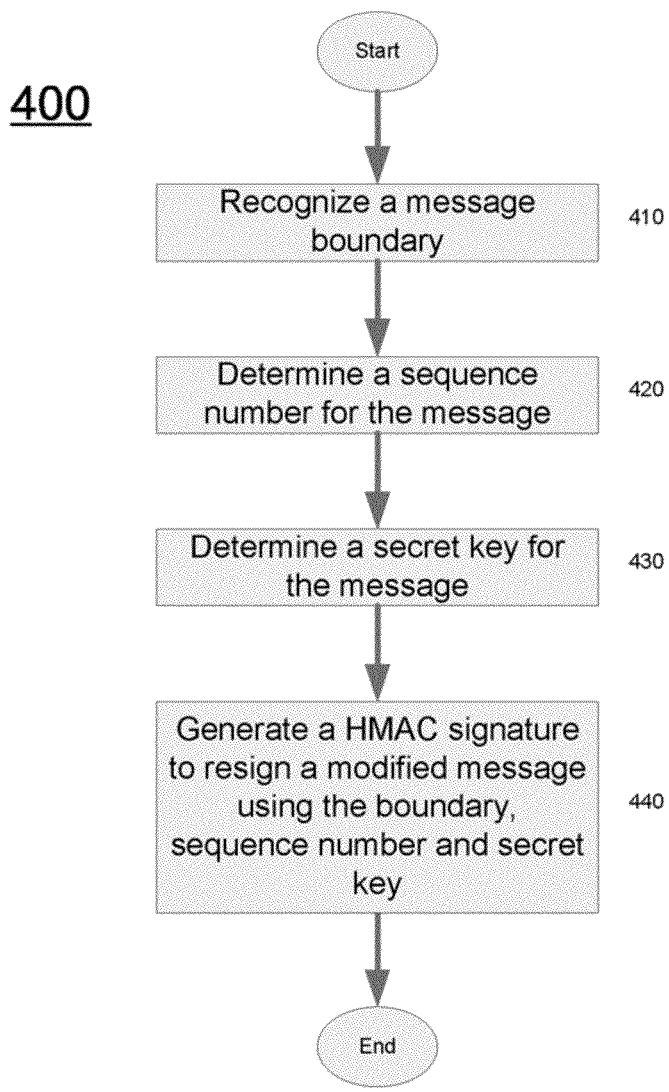
FIG. 4 illustrates an exemplary process for determining the components of an HMAC signature, consistent with an embodiment of the present invention.

FIG. 4 illustrates an exemplary process 400 for determining the components of an HMAC signature for a message, such as the intercepted message of process 300. In step 410, a boundary of a message, for example, an intercepted message is recognized. The message boundary may be recognized by any known protocol for recognizing message boundaries. For example, the SMB specification defines the format, and, hence, the boundaries, of an SMB message. Essentially, the netbios header includes a length field that indicates how long the message is. Immediately following the end of the subject message, another netbios header will indicate how long the next message is. By parsing messages to extract this information, the message boundaries can be located for purposes of the present invention. Of course, other techniques may be used as well. In step 420, a sequence number for the message may be determined. In some embodiments, the sequence numbers for messages are generated deterministically. Thus, the sequence number for a particular message may be determined by first determining an initial sequence number for the beginning of the HMAC transmission session. This initial sequence number may be used to derive the sequence number of the particular message.

In step 430, a secret key for the message may be determined. Further details regarding this determination are provided with reference to FIGS. 5 and 6. In step 440, an HMAC signature to resign a modified message, such as the modified message generated in process 300, may be generated and process 400 may end. The HMAC signature may be generated using, for example, the recognized message boundary, the determined sequence number, and/or the secret key.

Figure 5:
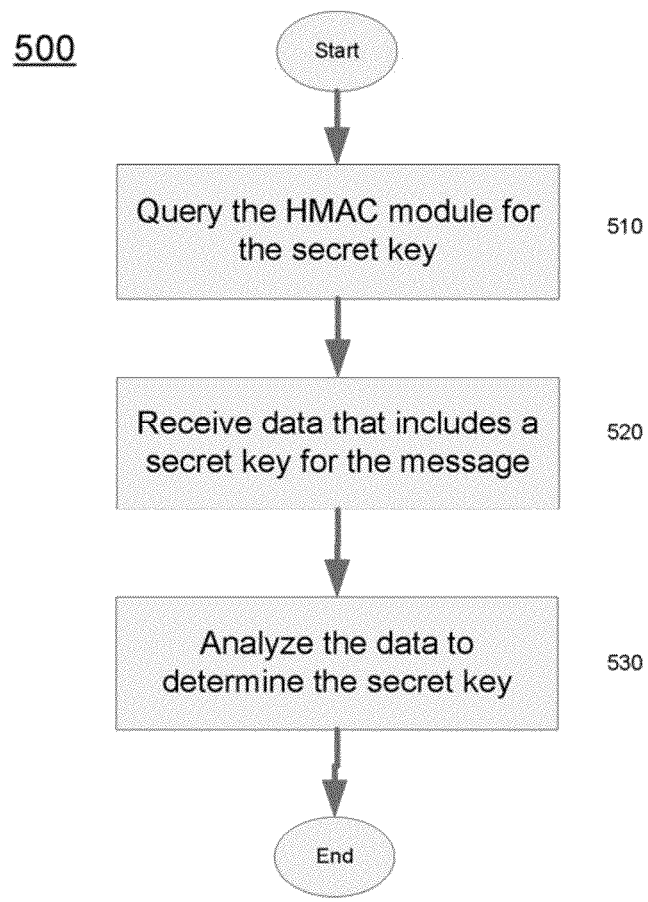
FIG. 5 illustrates an exemplary process for determining a security key used in an HMAC signature, consistent with an embodiment of the present invention.

FIG. 5 illustrates an exemplary process 500 for determining a secret key used in an HMAC signature. Process 500 may be performed by a system or apparatus enabled to determine a security key used in an HMAC signature. Exemplary systems for performing process 500 include system 100 and 200. Process 500 may be performed when a message is associated with a specific secret key.

In step 510, an HMAC module may be queried for a security key. The security key may be a public and/or a secret key. The querying may be performed by, for example, an interception module, such as interception module 115, 170 and/or 220. The query may be performed at, for example, an SSPI entry point or GSS-API entry point. In step 520, data that includes the security key may be received as a result of the query. The data may be received by, for example, an interception module, such as interception module 115, 170 and/or 220. The received data may then be analyzed (step 530) to determine the security key and process 500 may end.

Figure 6:
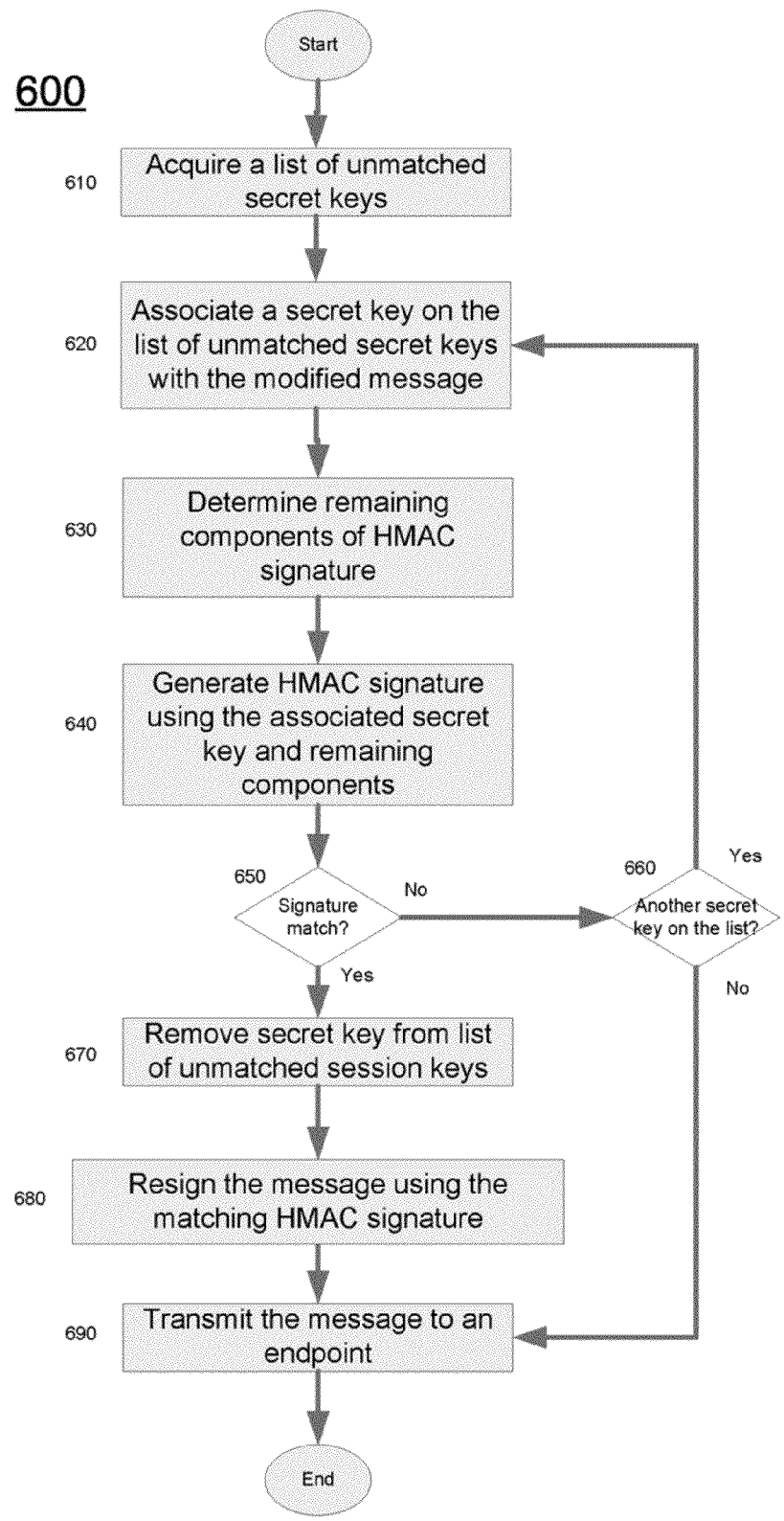
FIG. 6 illustrates an exemplary process for determining a security key used in an HMAC signature and communicating a modified HMAC signed message to an endpoint, consistent with an embodiment of the present invention.

FIG. 6 illustrates an exemplary process 600 for determining a secret key used in connection with an HMAC-signed message. Process 600 may be performed by a system or apparatus enabled to determine a secret key used in an HMAC-signed message. Exemplary systems for performing process 600 include system 100 and 200. Process 600 may be performed when an intercepted message is not yet associated with a specific secret key.

In step 610, a list of unmatched secret keys may be acquired or accumulated. The list may be acquired by, for example, interception module 115, 170, or 220, based on intercepted messages observed by that module. The list of unmatched keys may be periodically updated to remove secret keys that have expired. A secret key from the list may be associated with a modified message, such as the modified message produced by process 300 (step 620). The remaining components of an HMAC signature for the message may be determined via, for example, process 400 and/or 500 (step 630).

In step 640, an HMAC signature may be generated using, for example, the associated secret key and the remaining, determined, components of the HMAC signature. In step 650, a check is made to determine whether the generated HMAC signature matches the original HMAC signature of the message. If the HMAC signature does not match, it may be determined whether there is another secret key available in the list of unmatched secret keys (step 660). If there is another available secret key, steps 620 through 650 are repeated until a match is found or the list of keys is exhausted without a match. If there is not another available secret key, then the message may be transmitted to an endpoint without being modified. The list of unmatched keys may be periodically updated to remove expired keys.

If the HMAC signature does match, then the secret key associated with the message may be removed from the list of unmatched secret keys (step 670). The message may then be resigned, using the matching HMAC signature (step 680). In step 690, the resigned message may be transmitted to an endpoint, such as second endpoint 160 and process 600 quits.

Thus, systems, methods, apparatus, and computer readable media including computer executable instructions for communicating a modified hash message authentication code (HMAC) signed message between two endpoints have been described.

What is claimed is:

1. A method for communicating a message having a Hash Message Authentication Code (HMAC) signature from a first endpoint to a second endpoint, wherein HMAC information associated with the message includes a plurality of components, the method comprising:
   intercepting the HMAC information;
   determining values for at least one of the plurality of components of the HMAC information using the intercepted HMAC information, wherein the values include a secret key determined from one or more of a Security Support Provider Interface (SSPI) and Generic Security Service Application Programming Interface (GSS-API) interface entry point using an application programming interface (API) hook, the API hook exposing, via a kernel mode dynamic-link library (DLL), one or more of the SSPI and GSS-API interface entry points so as to allow the secret key to be queried at one or more of the SSPI and GSS-API interface entry points;
   intercepting the message having the HMAC signature;
   modifying the message;
   resigning the modified message using the determined values; and
   transmitting the resigned message to the second endpoint.

2. The method of claim 1, wherein the steps of claim 1 are performed by a Common Internet File System (CIFS) proxy.

3. The method of claim 1, wherein the plurality of components of the HMAC information includes at least one of a sequence number, a connection signing use NT Lan Manager (NTLM) challenge response, the secret key, a public key, a connection signing NTLM challenge response, and a message.

4. The method of claim 3, further comprising:
   deriving at least one of the connection signing use NTLM challenge response, the connection signing NTLM challenge response, and the message, using the intercepted HMAC information.

5. The method of claim 3, further comprising:
   determining an initial sequence number for the beginning of an HMAC transmission session; and
   deriving the sequence number of the intercepted message using the initial sequence number.

6. The method of claim 1, wherein the HMAC signature is a Server Message Block (SMB) signature.

7. The method of claim 1, wherein the first endpoint is at least one of a client, server, and host and the second endpoint is at least one of a client, server, and host.

8. A method for transmitting a message having a Hash Message Authentication Code (HMAC) signature from a first endpoint to a second endpoint, the method comprising:
   intercepting HMAC signature information including a sequence number and a secret key, wherein the secret key is determined from one or more of a Security Support Provider Interface (SSPI) and Generic Security Service Application Programming Interface (GSS-API) interface entry point using an application programming interface (API) hook, the API hook exposing, via a kernel mode dynamic-link library (DLL), one or more of the SSPI and GSS-API interface entry points so as to allow the secret key to be queried at one or more of the SSPI and GSS-API interface entry points;
   intercepting the message having the HMAC signature;
   recognizing a boundary of the message;
   determining the sequence number of the message;
   determining the secret key for the message;
   modifying the message;
   resigning the modified message using the message boundary, sequence number and secret key; and
   transmitting the resigned message to the second endpoint.

9. The method of claim 8, wherein the steps of claim 8 are performed by a Common Internet File System (CIFS) proxy.

10. The method of claim 8, wherein the HMAC signature is a Server Message Block (SMB) signature.

11. The method of claim 8, wherein the first endpoint is at least one of a client, server, and host and the second endpoint is at least one of a client, server, and host.

12. A system, wherein the system is enabled to transmit a message having a Hash Message Authentication Code (HMAC) signature from a first endpoint to a second endpoint, wherein HMAC information associated with the message includes a plurality of components, the system comprising:
   a storage device; and
   a set of instructions on the storage device, including:
       a software subroutine configured to intercept the HMAC information;
       a software subroutine configured to determine values for at least one of the plurality of components of the HMAC signature information using the intercepted HMAC information, wherein the values include a secret key determined from one or more of a Security Support Provider Interface (SSPI) and Generic Security Service Application Programming Interface (GSS-API) interface entry point using an application programming interface (API) hook, the API hook exposing, via a kernel mode dynamic-link library (DLL), one or more of the SSPI and GSS-API interface entry points so as to allow the secret key to be queried at one or more of the SSPI and GSS-API interface entry points;
       a software subroutine configured to intercept the message having the HMAC signature;
       a software subroutine configured to modify the message;
       a software subroutine configured to resign the modified message using the determined values; and a software subroutine configured to transmit the resigned message to the second endpoint.

13. A non-transitory computer readable media including instructions for transmitting a message having a Hash Message Authentication Code (HMAC) signature from a first endpoint to a second endpoint, wherein HMAC information associated with the message includes a plurality of components, the non-transitory computer readable media further including instructions for:

intercepting HMAC information;

determining values for at least one of the plurality of components of the HMAC information using the intercepted HMAC information, wherein the values include a secret key determined from one or more of a Security Support Provider Interface (SSPI) and Generic Security Service Application Programming Interface (GSS-API) interface entry point using an application programming interface (API) hook, the API hook exposing, via a kernel mode dynamic-link library (DLL), one or more of the SSPI and GSS-API interface entry points so as to allow the secret key to be queried at one or more of the SSPI and GSS-API interface entry points;

intercepting the message having the HMAC signature;

modifying the message;

resigning the modified message using the determined values; and transmitting the resigned message to the second endpoint.

* * * * *